United States Patent [19]

Reiter et al.

[11] Patent Number: 4,740,576

[45] Date of Patent: Apr. 26, 1988

[54] PREPARATION OF POLYAMIDOIMIDE COATINGS HAVING A LONG SHELF LIFE

[75] Inventors: Udo Reiter, Telgte; Hans-Josef Oslowski, Ludwigshafen; Paul Boerzel, Hamburg, all of Fed. Rep. of Germany

[73] Assignee: BASF Aktiengesellschaft, Ludwigshafen, Fed. Rep. of Germany

[21] Appl. No.: 942,821

[22] Filed: Dec. 17, 1986

[30] Foreign Application Priority Data

Dec. 17, 1985 [DE] Fed. Rep. of Germany ....... 3544548

[51] Int. Cl.$^4$ ............................................. C08G 18/80
[52] U.S. Cl. ...................................................... 528/45
[58] Field of Search .......................................... 528/45

[56] References Cited

U.S. PATENT DOCUMENTS

| | | | |
|---|---|---|---|
| 4,088,637 | 5/1978 | Zecher et al. | 528/45 |
| 4,374,221 | 2/1983 | McGregor et al. | 524/94 |
| 4,447,589 | 5/1984 | Nishizawa et al. | 528/45 |
| 4,497,944 | 2/1985 | Nishizawa et al. | 528/49 |

OTHER PUBLICATIONS

Derwent Abstracts: No. 83-719,413 (JP-A-58-101,117), 1983.

Primary Examiner—Maurice J. Welsh
Attorney, Agent, or Firm—Keil & Weinkauf

[57] ABSTRACT

Polyamidoimide coatings having a long shelf life are prepared by a process in which a tricarboxylic anhydride, some of which may have been replaced by tetracarboxylic dianhydrides or dicarboxylic acids, is reacted with a polyisocyanate possessing 2 or more isocyanate groups in an organic solvent which is inert to isocyanate groups, from 0.7 to 0.98 isocyanate group being employed per anhydride and carboxyl group, and completely blocked polyisocyanate being added to the reaction mixture before, during or after the reaction in an amount such that the ratio of the total amount of anhydride and carboxyl groups employed to the total amount of isocyanate groups used, including those present in blocked form, is from 1:1 to 1:1.1.

The polyamidoimide coatings are useful for coating electric conductors.

4 Claims, No Drawings

PREPARATION OF POLYAMIDOIMIDE COATINGS HAVING A LONG SHELF LIFE

The present invention relates to a process for the preparation of polyamidoimide coatings which have a long shelf life, by reacting tricarboxylic anhydrides with polyisocyanates, and the use of these coatings as insulation material for electric conductors.

The use of polyamidoimides (PAI) as highly heat-resistant electrical insulation materials has long been known. They are usually employed for electric conductors, eg. copper or aluminum coil wires, both as a base coat and as a top coat, in order to improve the mechanical and chemical properties.

PAI of this type is usually prepared by reacting either a monoacyl chloride of a tricarboxylic anhydride with a diamine (cf. U.S. Pat. No. 3,865,785), eg.

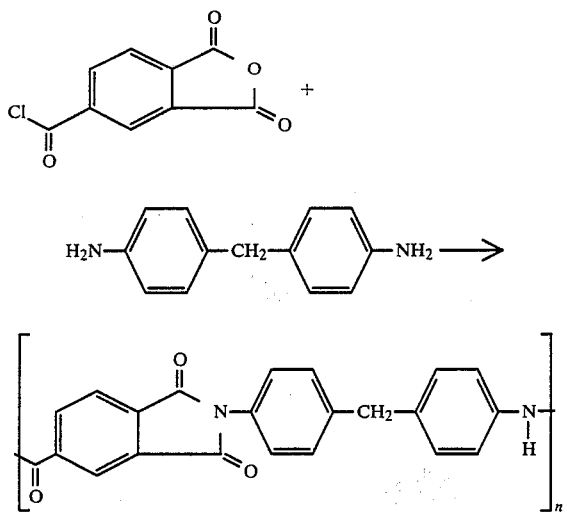

or a tricarboxylic anhydride with a diisocyanate (cf. U.S. Pat. No. 3,541,038 or U.S. Pat. No. 3,843,587), eg.

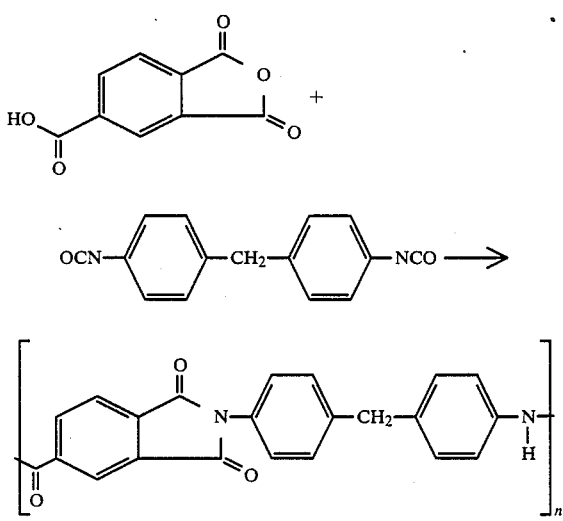

The first process requires great expenditure to eliminate the resulting chloride and is therefore becoming less and less important.

In the second process, the reactants have to be reacted in an anhydrous solvent system eg. N-methylpyrrolidone, until a relatively high molecular weight is reached, in order to obtain a polymer having the required thermal, chemical and mechanical properties and to avoid uncontrolled further crosslinking (gelling), during storage, by unreacted isocyanate radicals.

However, the high molecular weight of the resin formed requires the use of expensive special solvents, eg. N-methylpyrrolidone, in order to achieve sufficiently low viscosities; nevertheless, uneconomically low solids contents result.

A possible method of reducing the molecular weight while substantially retaining the mechanical properties of the polyamidoimide is described in U.S. Pat. No. 4,374,221 and German Pat. No. 3,249,544. According to U.S. Pat. No. 4,374,221, a tricarboxylic anhydride and a diisocyanate are employed in a ratio of 1:1 and the reaction is stopped by adding an isocyanate blocking agent when the reaction is already at an advanced stage, terminal isocyanate groups of polyamidoimide already formed being blocked.

According to German Pat. No. 3,249,544, a tricarboxylic anhydride and a diisocyanate are likewise employed in equimolar amounts, and the stability of the solution is improved by adding isocyanate blocking agents before, during or after the condensation, since, at low molecular weight, the concentration of the terminal functional groups of the resin increases in such a way that the viscosity of the resulting coating gradually rises in the course of time.

By adding 1–15% of a H-active substance to the initially taken isocyanate or to the isocyanate/tricarboxylic anhydride mixture before, during or after the condensation, some of the isocyanate functions are blocked and therefore removed from further reaction. In this case, the addition of the blocking agent thus serves simply to block terminal NCO groups. The reaction temperatures of up to 165° C. described in U.S. Pat. No. 4,374,221 restrict the blocking agents used to those having deblocking temperatures substantially above this temperature, for example to benzyl alcohol, which is also preferably used there, while on the other hand German Pat. No. 3,249,544 excludes the use of phenolic blocking agents.

Another, decisive disadvantage with regard to the chemical properties of the resulting polyamidoimides is due to the fact that, for statistical reasons, the terminal NCO functions are blocked virtually exclusively on one side, since, in the presence of the large excess of isocyanate, the blocking agent reacts preferentially at only one end even in the case of polyfunctional compounds, for example diisocyanate which has not yet been converted, and the fact that linear polymer structures without crosslinking are desired.

Furthermore, where a mixture of different isocyanates is used, selective blocking is not possible.

We have found, surprisingly, that the addition of polyisocyanates, which are already completely blocked, before, during or after the reaction of a tricarboxylic anhydride with less than the stoichiometric amount of di- or polyisocyanate not only leads to polyamidoimide coatings having a high solids content but, because of the wide range of isocyanates which can be added as a result, and the blocking agents used, also permits the thermal and mechanical properties of the baked coating to be varied over a wide range, thus giving wire enamels which have better technical properties than the prior art ones. By using trifunctional and polyfunctional isocyanates, it is possible to crosslink the polymer in a selective manner, which results in a substantial improvement in the properties.

The present invention relates to a process for the preparation of polyamidoimide coatings having a long shelf life, by reacting a tricarboxylic anhydride, some of which may be replaced by a tetracarboxylic dianhydride or a dicarboxylic acid, with a polyisocyanate, wherein a tricarboxylic anhydride, some of which may have been replaced by a tetracarboxylic dianhydride or a dicarboxylic acid, is reacted with a polyisocyanate which has 2 or more isocyanate groups in an organic solvent which is inert to isocyanate groups, with the proviso that from 0.7 to 0.98 isocyanate group is used per anhydride and carboxyl group, and a completely blocked polyisocyanate is added to the reaction mixture, before, during or after the reaction, in an amount such that the ratio of all anhydride and carboxyl groups employed to all isocyanate groups employed, including those present in blocked form, is from 1:1 to 1:1.1.

The reaction of the polyisocyanate with the tricarboxylic anhydride or with a mixture of this with a tetracarboxylic anhydride, dicarboxylic acid or dicarboxylic anhydride is preferably carried out at temperatures at which no elimination of the blocking agent from the fully blocked polyisocyanate takes place, in particular at from 90° to 180° C., and from 0.8 to 0.975 isocyanate group is preferably used per anhydride and carboxyl group.

The present invention furthermore relates to the use of the polyamidoimide coatings prepared according to the invention, with or without the addition of levelling agents, catalysts and other assistants, for coating electric conductors which may already be coated with other insulation materials, the coating being baked in a conventional manner.

Regarding the components which are suitable for the novel process, and the process conditions, the following may be stated specifically.

Suitable tricarboxylic anhydrides are those of the general formula

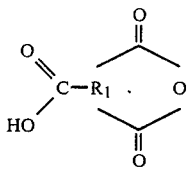

where $R_1$ is a trivalent aromatic or aliphatic radical, eg. trimellitic anhydride, naphthalenetricarboxylic anhydride and/or benzophenonetricarboxylic anhydride. Trimellitic anhydride is preferred. It is also possible to use mixtures of tricarboxylic anhydrides of this type. Some of the tricarboxylic anhydrides may be replaced by tetracarboxylic dianhydrides or dicarboxylic acids.

Examples of suitable tetracarboxylic dianhydrides, which can be used to replace 25, preferably 10, % by weight of the tricarboxylic anhydrides, are benzenetetracarboxylic dianhydrides, such as pyromellitic dianhydride, benzophenonetetracarboxylic dianhydride or mixtures of these.

Suitable dicarboxylic acids, which can be used to replace up to 80, preferably up to 30, % by weight of the tricarboxylic anhydrides, are aliphatic dicarboxylic acids, eg. succinic acid, adipic acid and/or azelaic acid, and preferably aromatic dicarboxylic acids, such as terephthalic acid, isophthalic acid, 2,6-naphthalenedicarboxylic acid or mixtures of these.

Suitable polyisocyanates for the reaction with a tricarboxylic anhydride are those of the general formula

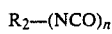

where $R_2$ is an aliphatic or aromatic organic radical and n is 2 or 3. Diisocyanates, such as toluylene diisocyanate, hexamethylene diisocyanate, isophorone diisocyanate or diphenylmethane diisocyanate, and mixtures of these are preferred.

Suitable completely blocked polyisocyanates are di- and polyisocyanates blocked with conventional blocking agents. The parent di- and polyisocyanates may be identical to, or different from, the abovementioned ones, for example reaction products of the abovementioned diisocyanates with polyalcohols (eg. Desmodur ® AP from Bayer AG), trimerization products (eg. Desmodur ® CT), biuret triisocyanates and other polyfunctional isocyanates.

Suitable blocking agents for the completely blocked di- and polyisocyanates are the organic compounds conventionally used for this purpose and having an active hydrogen atom, for example —NH, —OH, —CH-acidic compounds, such as phenols and alkyl-substituted phenols, alcohols of 1 to 16 carbon atoms, lactams, imides and oximes, eg. phenol, cresol, butanol, ethanol, 2-ethylhexanol, caprolactam, phthalimide, methyl ethyl ketoxime and/or dialkyl malates.

Suitable organic solvents which are inert to isocyanate groups are N-methylpyrrolidone, dimethylformamide, and dimethylacetamide, preferably N-methylpyrrolidone, with or without the addition of aromatic hydrocarbons, such as xylene, or mixtures of aromatic hydrocarbons, eg. Solvesso ® 100.

The reaction of less than the stoichiometric amount of the di- or polyisocyanate with the tricarboxylic anhydride or a mixture of this with di- and/or tetracarboxylic acid (anhydrides) can be carried out at from 70° to 250° C., preferably from 90° to 180° C., in particular at temperatures which are sufficiently low to avoid elimination of any blocking agent from the completely blocked polyisocyanate, where the latter is added to the reaction mixture before or during the reaction of the tricarboxylic anhydride with less than the stoichiometric amount of polyisocyanate. If the completely blocked di- or polyisocyanate is not added until the reaction is complete, for example after cooling the reaction mixture to 25°–100° C., it is also possible to add completely blocked di- or polyisocyanates which become deblocked at relatively low temperatures, for example those containing methyl ethyl ketoxime as the blocking agent.

If the polyamidoimide coatings prepared according to the invention are used for coating electric conductors, eg. wires of copper, copper alloys or aluminum, deblocking or curing catalysts, eg. diazabicyclooctane (DABCO) or iron acetylacetonate, and/or levelling agents, eg. phenol resins or higher alcohols such as benzyl alcohol, or other conventional assistants may be added to these coatings.

Furthermore, the entire system can be extended to form a polyesteramidoimide by a condensation reaction with the polyol components, eg. trishydroxyethyl isocyanate (THEIC), or with polyesters.

The polyamidoimide coating obtained after dilution can be applied directly as a coating on the electric conductor and then baked, or can be applied on top of or underneath another insulating material, eg. a polyester, a polyesterimide, polyurethane, a polyimide, etc., as a base coat or overcoat.

The novel process gives PAI coatings which have a high solids content and a particularly good shelf life and, when baked on electric conductors, produce surface coatings whose properties, depending on the intended use, can be adjusted to meet the particular requirements via the type of components used and in particular the type of blocked isocyanate added.

EXAMPLE 1

326 g of dry NMP were initially taken, and 128 g of trimellitic anhydride (TMA) and 150 g of 4,4'-diphenylmethane diisocyanate (MDI) were added under nitrogen. The mixture was heated continuously at 150° C. for 5–6 hours and cooled to about 50° C. after which 124 g of cresol-blocked MDI were added as a 25% strength by weight solution in NMP. The mixture was diluted with a 1:4 mixture of an aromatics mixtures (Solvesso 100) and NMP to give a coating having a solids content of 42.3% by weight (1 hour/180° C.) and a viscosity of 1940 mPa.s (RT) coupled with an excellent shelf life.

EXAMPLE 2

A polyamidoimide resin was prepared as described in Example 1; instead of the cresol-blocked MDI, 124 g of benzyl alcohol-blocked MDI were added as a 25% strength by weight solution in NMP. After dilution, a coating having a high solids content coupled with an excellent shelf life was obtained.

EXAMPLE 3

A polyamidoimide resin was prepared as described in Example 1; instead of the cresol-blocked MDI, 62 g of a reaction product of toluylene diisocyanate with trimethylolpropane, butanediol and cresol (Desmodur® AP from Bayer) were added. After dilution, a coating having a high solids content coupled with an excellent shelf life was obtained.

EXAMPLE 4

A polyamidoimide resin was prepared as described in Example 1; instead of the 150 g of MDI, 105 g of toluylene diisocyanate (TDI) were used. After dilution, a coating having a high solids content coupled with an excellent shelf life was obtained.

Application of the novel polyamidoimide coatings to electrically insulated wires can be carried out, after adjustment to suitable viscosities, by means of conventional application systems, and the enamel can be baked in a conventional oven at suitable temperatures (from 300° to 800° C.) depending on the coating rate.

The properties (measured according to DIN 46,453) of the enameled wire produced by the novel process were within the limits stated below and depended on the baking conditions. A commercial polyamidoimide coating was used as a comparative example.

|  | Examples 1–4 | Comparative example |
| --- | --- | --- |
| Solids content (1200 mPa.s): | 27–33% | 20–22% |
| Surface hardness: | 5–6 H | 5 H |
| Tearing test: | Satisfactory | Satisfactory |
| Winding strength (1 × D): | 20–25% Initial extension | 10% Initial extension |
| Heat shock: | 250° C. | 250° C. |
| Steep rise in tan: | 170–210° C. | 170–200° C. |

We claim:

1. A process for the preparation of a polyamidoimide coating composition having a long shelf life by reacting a tricarboxylic anhydride, some of which may be replaced by a tetracarboxylic dianhydride or a dicarboxylic acid, with a polyisocyanate wherein a tricarboxylic anhydride, some of which may have been replaced by a tetracarboxylic dianhydride or a dicarboxylic acid, is reacted with a polyisocyanate which has 2 or more isocyanate groups in an organic solvent which is inert to isocyanate groups, with the proviso that from 0.7 to 0.98 isocyanate group is used per anhydride and carboxyl group, and a completely blocked polyisocyanate is added to the reaction mixture at a temperature at which no elimination of the blocking agent from the fully blocked polyisocyanate takes place, before, during or after the reaction, in an amount such that the ratio of all anhydride and carboxyl groups employed to all isocyanate groups employed, including those present in blocked form, is from 1:1 to 1:1.1.

2. A process as claimed in claim 1, wherein the reaction of the polyisocyanate with the tricarboxylic anhydride, some of which may have been replaced by a tetracarboxylic dianhydride or dicarboxylic acid, is carried out at temperatures which are sufficiently low to avoid elimination of the blocking agent from the completely blocked polyisocyanate.

3. A process as claimed in claim 1, wherein the reaction of the polyisocyanate with the tricarboxylic anhydride, or the mixture of this with a tetracarboxylic dianhydride or dicarboxylic acid, is carried out at from 90° to 180° C.

4. A process as claimed in claim 1, wherein from 0.8 to 0.975 isocyanate group is used per anhydride and carboxyl group.

* * * * *